United States Patent Office

3,719,631
Patented Mar. 6, 1973

3,719,631
ETHYLENE OXIDE POLYMER COMPOSITION
Kenichi Hattori, Yuichi Ueda, and Yukio Tanino, Wakayama, Japan, assignors to Kao Soal Co., Ltd., Tokyo, Japan
No Drawing. Continuation-in-part of application Ser. No. 862,510, Sept. 30, 1969. This application May 28, 1971, Ser. No. 148,210
Claims priority, application Japan, Oct. 3, 1968, 43/72,119
Int. Cl. C08g 51/60
U.S. Cl. 260—45.8 SN          1 Claim

ABSTRACT OF THE DISCLOSURE

Stabilized ethylene oxide polymer compositions having an intrinsic viscosity greater than 0.03 and containing 0.05 to 15% by weight of an amino-2-mercaptobenzothiazole, or a benzothiazole or an oxobenzisosulfonazole of Formulas I, II and III, respectively.

CROSS REFERENCE TO RELATED APPLICATION

This is a continuation-in-part of application Ser. No. 862,510, filed Sept. 30, 1969, now Pat. No. 3,634,315.

This invention relates to stabilized ethylene oxide polymer compositions.

SUMMARY OF THE INVENTION

We have discovered that amino-2-mercaptobenzothiazoles (I), benzothiazoles (II) and oxobenzisosulfonazoles (III) of the formulas:

and wherein
$Y = NH_2$ or $N(Alk)_2$
$X = H$, $NH_2$ or $NH(Alk)$
$Z = H$ or $NH_2$
$M = H$ or $Na$ (wherein "Alk" is an alkyl radical of from 1 to 6 carbon atoms); possess superior stabilizing properties for ethylene oxide polymers.

Ethylene oxide polymers are well known and constitute a class of water-soluble high molecular weight compounds useful as thickening agents, flocculating agents, dispersing agents, textile sizing, sizes and binders, and, in sheet form are useful as wrapping film and the like.

Ethylene oxide polymers are subject to deterioration on standing or on exposure to oxygen-containing environment or to elevated temperatures, either in the solid state or in solution. The deterioration is manifested by a decrease in the degree of polymerization and loss of useful properties.

Representative examples of compounds of Formulas I, II and III which can be used in this invention are:

1. $Y = NH_2$
6-amino-2-mercaptobenzothiazole, melting point: 263°C., soluble in aniline, pyridine, and chloroform.

2. $Y = N(CH_3)_2$
6-dimethylamino-2-mercaptobenzothiazole, melting point: 230° C., soluble in alcohol and acetone.

3. $Z = H$, $X = H$
Benzothiazole, boiling point: 223–5° C., soluble in alcohol, carbon disulfide and water, 4. $Z = NH_2$, $X = H$
6-aminobenzothiazole, melting point: 87° C., soluble in alcohol.

5. $Z = H$, $X = NH_2$
2-aminobenzothiazole, melting point: 129–130° C., soluble in alcohol, ether and chloroform.

TABLE—Continued

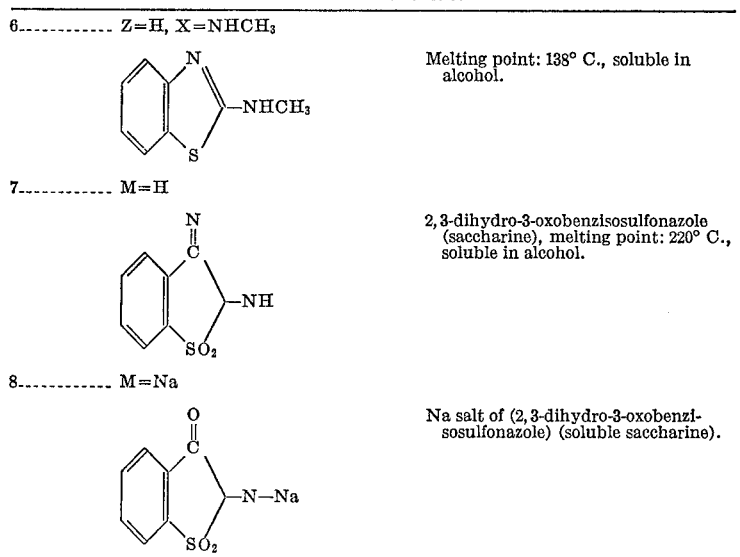

| | | |
|---|---|---|
| 6 | Z=H, X=NHCH₃ | Melting point: 138° C., soluble in alcohol. |
| 7 | M=H | 2,3-dihydro-3-oxobenzisosulfonazole (saccharine), melting point: 220° C., soluble in alcohol. |
| 8 | M=Na | Na salt of (2,3-dihydro-3-oxobenzisosulfonazole) (soluble saccharine). |

To effect stabilization of an ethylene oxide polymer, either of the following methods can be followed. The stabilizer compound I or II or III can be added to a solution of ethylene oxide polymer dissolved in a solvent for the polymer, such as water, benzene, acetone or chloroform. The stabilizer can be added to a dispersion of the polymer in a liquid suspending agent in which the polymer is not soluble, for example, dialkyl ethers such as diethyl ether or low boiling hydrocarbon such as hexane, followed by removal of the suspending agent as by evaporation. Thirdly, the stabilizer can be added by blending directly with the polymer.

By the addition, of 0.5% or more, by weight, preferably 2% to 10% by weight, of the stabilizer to the ethylene oxide polymer, the superior stability mentioned above is achieved. Addition of more than 15% by weight is unnecessary and, in many areas of use in undesirable because of the resulting odor. The ethylene oxide polymers that can be stabilized according to the present invention are generally the polymers having intrinsic viscosities greater than 0.03 (35° C., water). These can be obtained by polymerizing ethylene oxide by conventional methods, i.e. in the presence of a catalyst such as an acid, an alkali, aluminum chloride, zinc chloride, iron chloride, an alkaline earth metal salt such as the silicate or the carbonate, an organic metal compound such as triethyl aluminum and the like. To obtain a polymer having an intrinsic viscosity of more than 1.0 it is conventional to employ suspension polymerization methods using a solid catalyst, for example an alkaline earth metal salt such as calcium silicate; or to employ a blowing method using an organic metal compound.

Ethylene oxide polymers are solid at room temperature if the intrinsic viscosity exceeds about 0.03. Under the conditions of storage and use mentioned above, these solid polymers tend to decompose to polymers with lower molecular weights. The tendency to decompose appears to increase with an increase in molecular weight of the polymer. It also increases with duration of aging and with increase in temperature. This tendency appears to be independent of the polymerization method or catalyst used.

Ethylene oxide polymers having intrinsic viscosities in excess of 1.0 are especially useful in a wide variety of industrial fields, and are particularly liable to decomposition. This invention is especially adaptable to stabilizing such ethylene oxide polymers having an intrinsic viscosity in excess of 1.0.

Over the range of molecular weights beginning with those corresponding to 0.03 intrinsic, particularly those having an intrinsic viscosity above 1.0, the novel stabilizers of this invention provide ethylene oxide compositions having thermal stability and resistance to aging and oxidation deterioration superior to those obtained with such conventional stabilizers as 2,6-di-t-butyl-p-cresol.

DESCRIPTION OF THE PREFERRED EMBODIMENTS

Example 1

A high polymer of ethylene oxide was synthesized with calcium silicate as the catalyst and used as the sample for the test of stability.

The intrinsic viscosity of the polymer in water at 35° C. immediately after the dissolution was 9.8, corresponding to a molecular weight of approximately two million. An aqueous 0.5% solution of the said polymer was prepared and aliquots each of 50 ml. were placed in conical flasks with stoppers, 5 mg. of the stabilizers indicated in Table 1 were added respectively. The viscosity of each test solution shaken at 40° C. for three days was determined, and the percentage of decomposition was calculated from the percentage of lowering in the viscosity. The results are shown in Table 1. The results obtained by using (1) 2,6-di-t-butyl-p-cresol, as a known antioxidant, and (2) no stabilizer, are also listed in the table for comparison.

TABLE 1

| Stabilizer: | Percent decomposition |
|---|---|
| 6-amino-2-mercaptobenzothiazole | 18 |
| Benzothiazole | 16 |
| 2-methylaminobenzothiazole | 23 |
| 2,6-di-t-butyl-p-cresol | 36 |
| 2,3-dihydro-3-oxobenzisosulfonazole | 18 |
| 2,3-dihydro-3-oxobenzisosulfonazole-Na salt | 21 |
| No stabilizer | 61 |

Example 2

Powders of the ethylene oxide polymer as used in Example 1 (5 g.) were dispersed in 200 ml. of diethyl ether, to which was added 0.1 g. of 6-dimethylamino-2-mercaptobenzothiazole. The solvent was removed by distillation and the resulting solid composition comprising a mixture of the polymer and the incorporated stabilizer was allowed to stand for one month at room temperature exposed to the air. The results on the percentage of decomposition determined according to the percentage of lowering in the viscosity in an aqueous solution at 35° C. was 29%. A control with no stabilizer exhibited 87% decomposition. A corresponding experiment using 2-aminobenzothiazole showed a percentage of decomposition of 26%.

Example 3

Powdered ethylene oxide polymer (12 g.) as used in Example 1 and the stabilizer 0.24 g. of 6-aminobenzothiazole were directly blended, melted into a film, and allowed to stand for one month at room temperature after being cooled. The results on the percentage of decomposition determined according to the percentage of lowering in the viscosity in an aqueous solution at 35° C. was 17%, while a control with no stabilizer exhibited 97% decomposition.

The embodiments of the invention in which an exclusive property or privilege is claimed are defined as follows:

1. An ethylene oxide polymer composition wherein the ethylene oxide polymer has an intrinsic viscosity of more than 0.03, comprising 0.5% to 15% by weight of a compound selected from the group consisting of 2,3-dihydro-3-oxobenzisosulfonazole and the Na salt thereof.

References Cited

UNITED STATES PATENTS

| 3,262,907 | 7/1966 | Perry | 260—45.8 |
| 3,389,124 | 6/1968 | Sparks | 252—51.5 |

FOREIGN PATENTS

| 949,992 | 2/1964 | Great Britain. |

DONALD E. CZAJA, Primary Examiner

R. A. WHITE, Assistant Examiner

U.S. Cl. X.R.

260—45.95